//

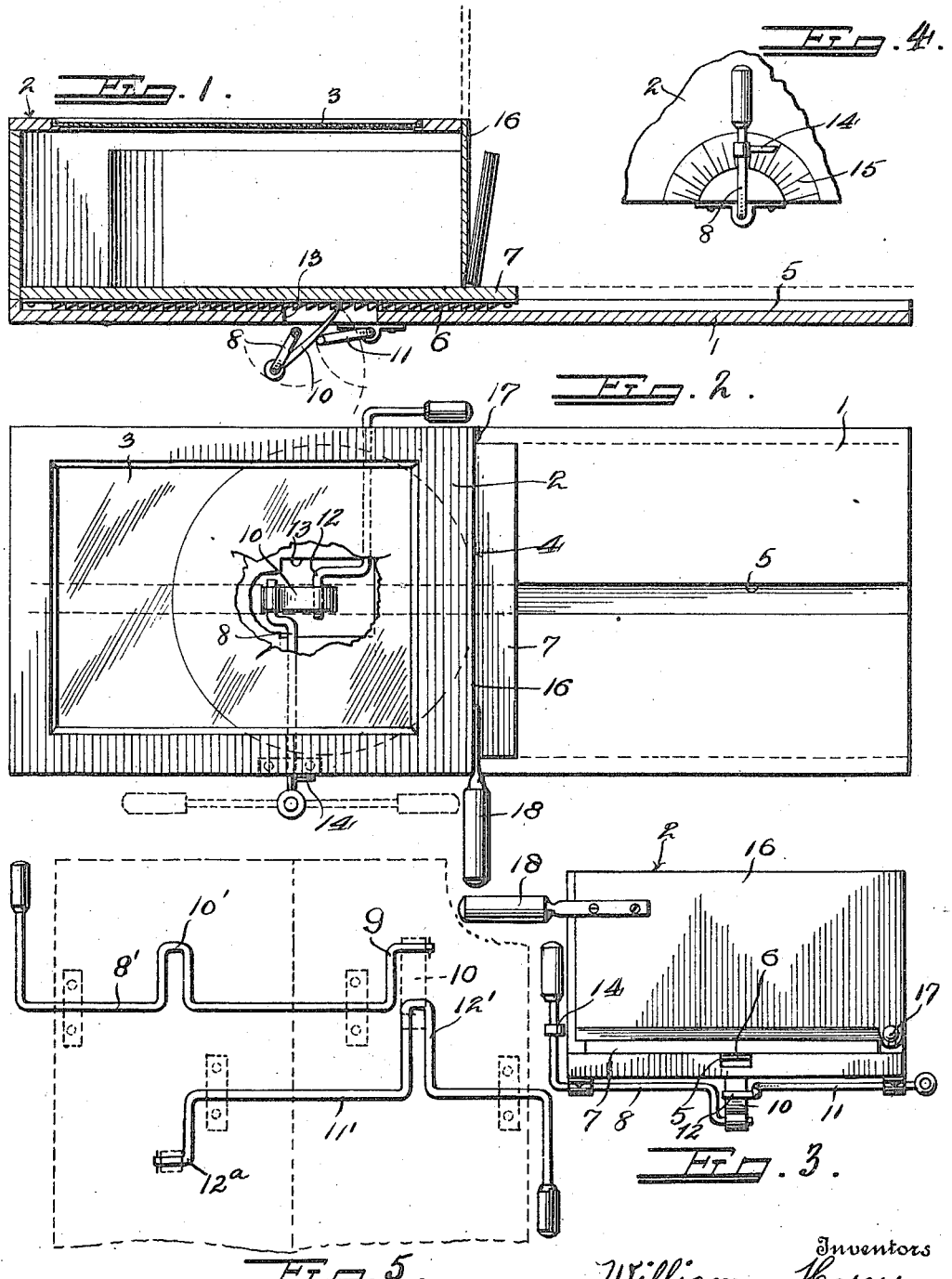

UNITED STATES PATENT OFFICE.

WILLIAM HOSEY AND WILLIAM WEBB, OF CORNING, ARKANSAS.

CHEESE-CUTTING APPARATUS.

1,233,360.        Specification of Letters Patent.      Patented July 17, 1917.

Application filed March 10, 1915. Serial No. 13,438.

*To all whom it may concern:*

Be it known that we, WILLIAM HOSEY and WILLIAM WEBB, citizens of the United States, residing at Corning, in the county of Clay and State of Arkansas, have invented certain new and useful Improvements in Cheese-Cutting Apparatus, of which the following is a specification.

Our invention relates to cutting apparatus and consists essentially in an improved combined cheese case and cutter.

The object of the invention is to provide a simply constructed device of this character in which that portion of the cheese to be cut or severed is projected beyond one end of a transparent case and the remainder of the cheese protected and housed within the case until another portion is to be severed; the cheese to be projected only so fast as required.

Another object of the invention is to generally improve the case structure and to equip the device or apparatus with a cutting implement of a size and design to serve, when inoperative, as a closure means for the open end of the case through which the cheese is adapted to be projected.

As a further object of the invention we contemplate improved mechanism for advancing the cheese bodily into a position for cutting and at the same time indicating upon a suitable dial the amount or size of the cheese portion thus advanced.

The above and additional objects are accomplished by such means as are illustrated in their preferred embodiment in the accompanying drawings, described in the following specification and then more particularly pointed out in the claims which are appended hereto and form a part of this application.

In describing our invention in detail reference will be had to the accompanying drawings wherein like characters denote like or corresponding parts throughout the several views, and in which:—

Figure 1 is a longitudinal sectional view of my improved apparatus;

Fig. 2 is a top plan view;

Fig. 3 is an end view;

Fig. 4 is a fragmentary side elevation illustrating in detail the indicating mechanism; and Fig. 5 is a view in bottom plan of a modified form of my invention.

Before proceeding with the description of the drawings we desire to call particular attention to the fact that while we have evolved our invention with reference to its use as a cheese cutting apparatus, the same may be readily utilized, for cutting purposes, to house and protect any and all commodities of a similar nature.

Referring now to the drawings by numerals, 1 designates an elongated horizontal flat support or base upon the top face of which the case or housing structure 2 is built, the said case being provided with a transparent top 3 and an open end 4, the latter leading from the interior of the case to that portion of the base or support 1 extending therebeyond.

Base 1 is longitudinally grooved as indicated at 5 whereby to form a guide for a rack bar 6 hereinafter more particularly described.

What may be termed a cheese board 7 is arranged upon the top face of the base 1, the said board being adapted for sliding movement longitudinally of the base from a position entirely within to a position entirely without the case. As illustrated to advantage in Fig. 1 the underneath side of the cheese board 7 is equipped with the before mentioned rack 6, the said rack fitting the groove 5 and, during advancement of the board, being adapted for sliding movement longitudinally thereof.

The said board 7 is of a size and design to fit upon the interior of the case 2, the marginal longitudinal edges of the board engaging the inner side walls of the case to in this manner preclude lateral displacement during advancement.

An operating lever 8 of special design is arranged upon the underneath side of the base or support 1. Said lever 8 is of a crank formation, the crank end 9 carrying a pawl 10 which is adapted for positive engagement with the teeth of the rack bar 6 to advance the cheese board 7 when it is desired that the contents of the case be projected beyond the open end, it being understood that the contents, by reason of its inherent weight, will move in accord with the board. To limit turning movement of the lever 8', an offset 10' may be formed therein, as shown in the modified form of my invention illustrated in Fig. 5, the offset being engageable with the under side of the base or support. Pawl 10 is held in engagement with the teeth of the rack bar 6 by means of a coöperating weight lever 11, the said last mentioned lever likewise being of a crank formation, its weight, as suggested above, maintaining an offset 12 formed therein in yielding engagement with the under side of the pawl, thereby at all times yieldably maintaining said pawl in positive contact with the rack. The pawl, as evidenced in Fig. 1 operates in an opening 13 formed in the base.

In the modified form of my invention the lever 11' may be formed with an offset 12' at a point substantially intermediate its end, and a second offset 12$^a$ at its terminal, said offset being disposed in an angular relation of not less than 180° whereby to limit rotative movement of the lever by engagement with either of said offsets with the bottom of the device.

The handle portion of the lever 8 is equipped with an indicating element 14, said element, during movement of the lever, traversing a dial plate 15 mounted on the outside of the case 2 in such proximity to the handle of the lever as to provide for an indication upon the dial of the degree of movement imparted to the cheese board 7 through movement of the lever 8.

The advancing mechanism having been thus fully described, we shall now proceed with a description of the means employed to sever or cut the cheese subsequent to such advancement as noted above. The open end 4 of the case 2 is normally closed by a knife or cutting implement 16 of special design, the said implement having pivotal connection as indicated at 17 to the case 1 at a point adjacent the base structure 1 and at one side thereof. Said cutting implement 16 may also be provided with a handle 18 whereby a cutting operation is facilitated. In operation, the cutting implement is adapted to operate against the open end of the case, its cutting edge normally extending parallel with the top face of the cheese board 7 and resting thereon.

When it is desired that a portion of the cheese block be cut or severed, it is but necessary to manipulate the lever 8 to the extent desired or as indicated upon the dial 15, such proper manipulation of the lever causing the pawl 10 to advance the cheese board forwardly of the device and from a position within to a position without the case, the board carrying the cheese block therewith. Said board having been advanced to the desired extent, the blade or cutting implement 16 is drawn across the block to a position closing the open end of the case, the said implement as it is thus moved into contact with the cheese board causing that portion of the cheese block projected to be severed or cut. Said cutting implement, subsequent to a cutting operation as noted above, is allowed to remain in contact with the cheese board, thus affording a closure means for the open end of the case and precluding the admission of dust and insects to the case interior, thereby protecting the uncut cheese.

From the foregoing, taken in connection with the accompanying drawings it is apparent that by keeping the rack bar in the groove 5, longitudinal movement of the board 7 is directed as desired; that the uncut portion of the cheese is made visible to the operator of the device by the provision of the transparent case top 3; and that the inherent weight of lever 11 is sufficient to yieldingly maintain the pawl 10 in the desired engagement with the teeth of the rack bar 6.

In reduction to practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claims.

Having thus fully described our invention, what we claim as new and desire to secure by Letters Patent, is:—

1. In a cheese cutting apparatus, a case open at one end, the bottom of the case extending beyond said open end, a cheese board mounted to move from a position within to a position without the case, a rack bar fastened to said board upon the under side thereof, said bar fitting a groove therefor formed in the bottom of the case, a lever, a pawl mounted on the lever and engaging the rack bar to move it, a weighted lever mounted to engage the pawl and maintain it in yielding engagement with the rack bar, and a cutting implement pivoted at one side of the open end of the case, said implement normally resting upon the board aforesaid to provide a closure for the said open end of the case.

2. In a cheese cutting apparatus, a case, a cheese board movable from a position within to a position without the case, a rack bar secured to the board, a crank arm, a pawl on the crank arm, engaging the rack bar, said crank arm being movable in one direction to move the board, a dial plate for indicating the extent of movement of the crank arm and consequently the cheese board, and means on the crank arm for limiting its movement in a counter direction by engagement with the case.

In testimony whereof we affix our signatures in presence of two witnesses.

WILLIAM HOSEY.
WILLIAM WEBB.

Witnesses:
S. P. LINDSEY,
PERRY SIMPSON.

Copies of this patent may be obtained for five cents each, by addressing the "Commissioner of Patents, Washington, D. C."